(12) United States Patent
Deng

(10) Patent No.: US 10,713,514 B2
(45) Date of Patent: Jul. 14, 2020

(54) IDENTIFICATION METHOD AND ELECTRONIC DEVICE

(71) Applicant: LENOVO (BEIJING) CO., LTD., Beijing (CN)

(72) Inventor: Yuanyuan Deng, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/015,520

(22) Filed: Jun. 22, 2018

(65) Prior Publication Data

US 2018/0373949 A1 Dec. 27, 2018

(30) Foreign Application Priority Data

Jun. 23, 2017 (CN) .......................... 2017 1 0491431

(51) Int. Cl.
| | |
|---|---|
| G06K 9/20 | (2006.01) |
| G06K 7/14 | (2006.01) |
| G06K 9/00 | (2006.01) |
| H04N 5/232 | (2006.01) |
| G06K 9/32 | (2006.01) |
| G06F 3/0484 | (2013.01) |
| G06F 3/16 | (2006.01) |

(52) U.S. Cl.
CPC ......... G06K 9/2081 (2013.01); G06K 7/1417 (2013.01); G06K 9/00201 (2013.01); G06K 9/00671 (2013.01); G06K 9/325 (2013.01); H04N 5/23218 (2018.08); H04N 5/232939 (2018.08); G06F 3/04845 (2013.01); G06F 3/167 (2013.01); G06K 2209/01 (2013.01); H04N 5/23293 (2013.01)

(58) Field of Classification Search
CPC .. G06K 9/2081; G06K 9/325; G06K 9/00671; G06K 9/00201; G06K 7/1417; G06K 2209/01; H04N 5/23218; H04N 5/232939; H04N 5/23293; G06F 3/04845; G06F 3/167
USPC ........................................ 348/333.01–333.08
See application file for complete search history.

(56) References Cited

U.S. PATENT DOCUMENTS

| | | | | |
|---|---|---|---|---|
| 2016/0063727 A1* | 3/2016 | Gao | .................... | G06K 9/00335 382/103 |
| 2016/0154579 A1* | 6/2016 | Lee | ..................... | G06F 3/04883 382/189 |
| 2016/0203525 A1* | 7/2016 | Hara | .................. | G06Q 30/0271 705/14.56 |

FOREIGN PATENT DOCUMENTS

| | | |
|---|---|---|
| CN | 104598289 A | 5/2015 |
| CN | 104850835 A | 8/2015 |
| CN | 104916035 A | 9/2015 |

* cited by examiner

*Primary Examiner* — Yogesh K Aggarwal
(74) *Attorney, Agent, or Firm* — Anova Law Group, PLLC

(57) ABSTRACT

An identification method and an electronic device are provided. The identification method comprises: detecting at least one object using the electronic device; providing an identification box having a first appearance which corresponds with the at least one object as detected; and displaying the identification box having the first appearance via the electronic device.

16 Claims, 5 Drawing Sheets

… (1)

IDENTIFICATION METHOD AND ELECTRONIC DEVICE

CROSS-REFERENCES TO RELATED APPLICATIONS

This application claims the priority of Chinese patent application No. 201710491431.6, filed on Jun. 23, 2017, the entire content of which is incorporated herein by reference.

FIELD OF THE DISCLOSURE

The present disclosure relates to an identification method applied to an electronic device and an electronic device.

BACKGROUND

With the wide spread of internet applications, a variety of applications (Apps) have sprung up, which bring great convenience to people. For example, when checking out at a supermarket, a user only needs to open an App installed on his/her phone, then scan the quick response (QR) code by an identification box in the App to pay. For another example, when the user is translating English to Chinese, the identification box provided by a translation software can identify the word to be translated, then the Chinese corresponding to the word will be displayed on the mobile phone.

However, the existing identification methods may be unable to manually or automatically adjust the appearance of the identification box. When words, sub-images or two-dimensional codes simultaneously exist in an image to be identified, the identification box may be unable to identify multiple objects accurately, which degrades the user experience.

BRIEF SUMMARY OF THE DISCLOSURE

One aspect of the present disclosure provides an identification method applied to an electronic device. The identification method comprises: detecting at least one object using the electronic device; providing an identification box having a first appearance which corresponds with the at least one object as detected; and displaying the identification box having the first appearance via the electronic device.

Another aspect of the present disclosure provides an electronic device. The electronic device comprises: a processor; an imaging unit coupled to the processor; and a display unit coupled to the processor, wherein the imaging unit is operative to detect at least one object, the processor is operative to determine an identification box having a first appearance which corresponds with the at least one object as detected by the imaging unit, and the display unit is operative to display the identification box having the first appearance on the electronic device as determined by the processor.

Other aspects of the present disclosure may be understood by those skilled in the art in light of the description, the claims, and the drawings of the present disclosure.

BRIEF DESCRIPTION OF THE DRAWINGS

To more clearly illustrate technical solutions of embodiments or in the prior art, accompany drawings which need to be used in the description of the embodiments or the prior art will be simply introduced. Obviously, the accompany drawings in the following description are merely some embodiments, and for those of ordinary skill in the art, other embodiments can further be obtained according to these accompany drawings without contributing any creative work.

DETAILED DESCRIPTION

Figure 1A:
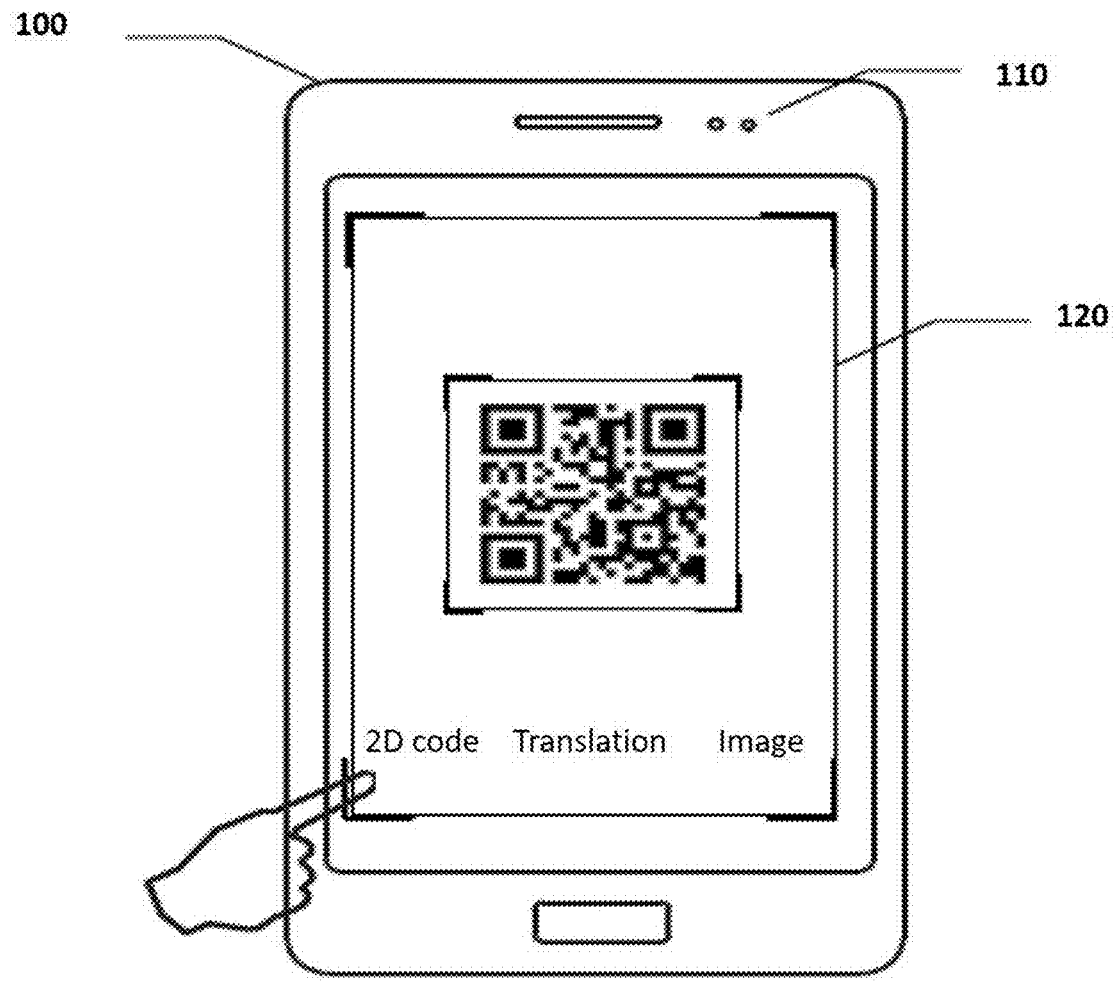
FIG. 1A and FIG. 1B illustrate a schematic diagram of an existing identification method implemented into an electronic device.

Reference will now be made in detail to examples of embodiments of the disclosure, which are illustrated in the accompanying drawings. Wherever possible, the same reference numbers will be used throughout the drawings to refer to the same or like parts. Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure. Further, in the following, known structures and technologies are not described to avoid obscuring the present disclosure unnecessarily.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Aspects of the present disclosure are described below with reference to flowchart illustrations and/or block diagrams. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagrams.

As will be appreciated by the skilled in the art, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a transmission media such as those supporting the Internet or an intranet, or any suitable combination of the foregoing. In the context of this document, a computer readable storage medium may be any tangible medium that can contain, or store a program for use by or in connection with an instruction execution system, apparatus, or device.

Figure 1B:
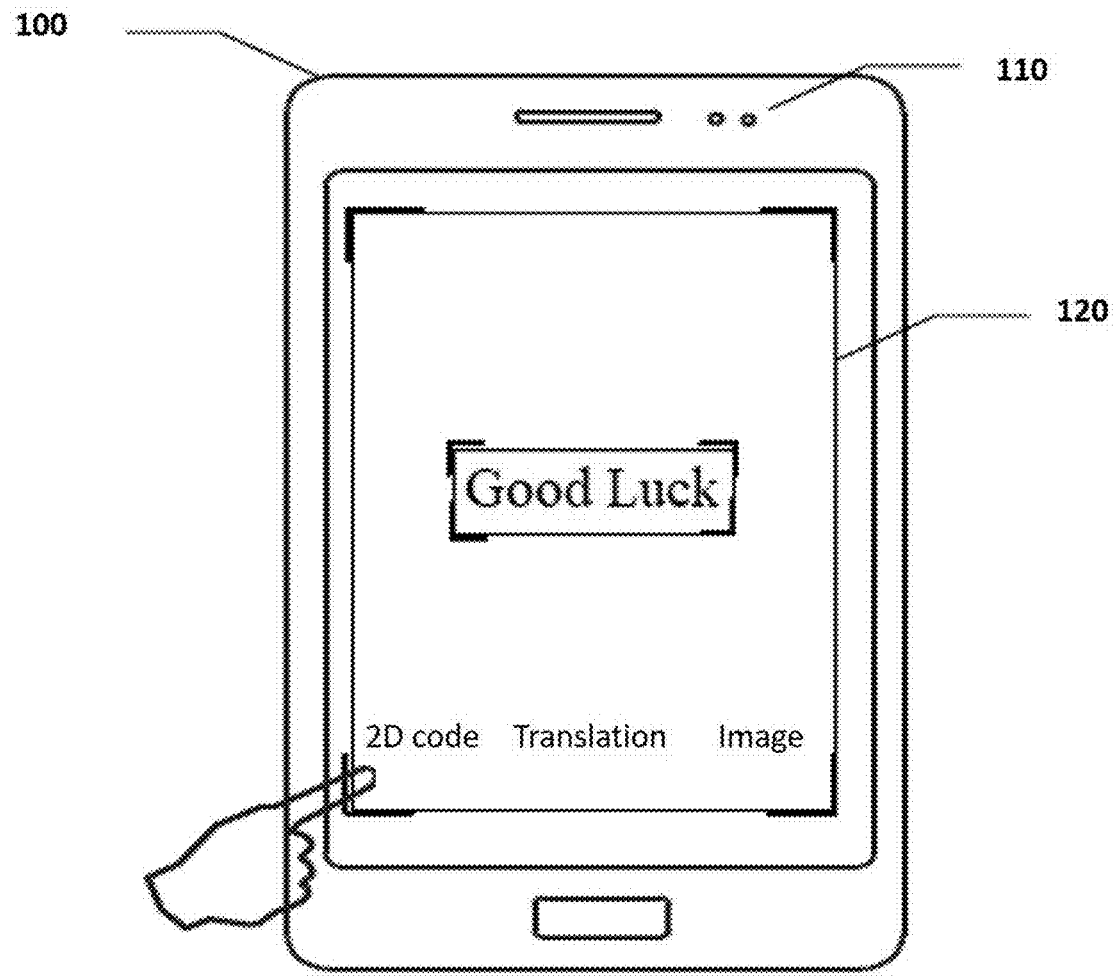

FIG. 1A and FIG. 1B illustrate a schematic diagram of an existing identification method implemented into an electronic device.

As shown in FIG. 1A and FIG. 1B, the identification method implemented into an electronic device 100 includes: capturing an image containing an object by a camera unit 110, then selecting an identification type of an identification box 120 through a user manual operation. For example, when the image of the object is a two-dimensional (2D) code, as shown in FIG. 1A, the identification type of the identification box 120 is selected to be "Two-dimensional code". When the image of the object is the text "Good Luck", as shown in FIG. 1B, the identification type of the identification box 120 is selected to be "Translation".

However, when the capture image includes multiple objects, it may be a challenge for existing identification methods to recognize a specific object in the captured image and present the specific object information to the user, because the identification box 120 may be affected by the size of the object to be identified (or called as the identification object) as well as the distance between the electronic device 100 and the identification object. Accordingly, a specific object in the captured image may be unable to be selected. For example, when the electronic device 100 is arranged too close to the identification object, the imaging unit 110 may be unable to focus on the identification object and, thus, the object may be unable to be selected.

In view of one or more problems set forth above and other problems, the present disclosure provides an improved identification method which could be implemented into an electronic device. The identification method may include: acquiring an image including at least one object; analyzing the image to determine an identification box having a first appearance which matches the at least one object; and displaying the identification box having the first appearance on the electronic device. The electronic device may provide at least two identification boxes having different appearances, and identify at least two types of objects.

Figure 2:
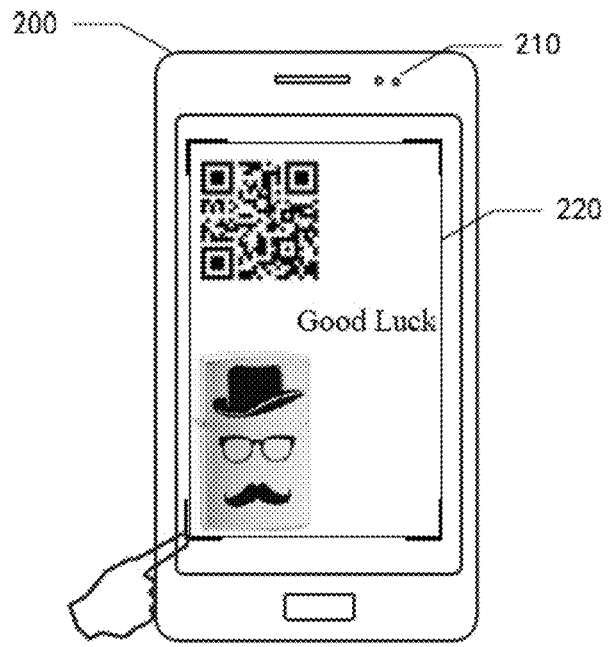
FIG. 2 illustrates an exemplary application scenario for an exemplary identification method implemented into an electronic device consistent with disclosed embodiments.

FIG. 2 illustrates an exemplary application scenario for an exemplary identification method implemented into an electronic device consistent with disclosed embodiments.

As shown in FIG. 2, an identification box 220 may be displayed on the screen of the electronic device 200. The identification box 220 may scan an object in an image captured by the camera unit 210. During scanning the object in the captured image, the identification box 220 may automatically adjust the identification type and the appearance of the identification box 220 according to the type of the object in the captured image, then present the object information acquired from scanning the object to the user.

For example, in response to capturing an image including a plurality of objects, the identification box 220 may automatically adjust the appearance and the identification type of the identification box 220. After the object information is not displayed within a fixed period (e.g., 5 seconds), the identification box 220 may be manually adjusted, by the user, to a specific area to identify the object in the captured image, then present the object information to the user. The specific area here may refer to an area where the 2D code in the captured image is located, or an area where the text "Good Luck" is located, etc., which is not limited by the present disclosure. In certain embodiments, after the object information is not displayed within a fixed period (e.g., 5 seconds), the App may give the user a hint of the identification type, for example, displaying "2D code", "Translation" and "Image" below the identification box. Then the user may select a corresponding identification type, and the appearance of the identification box may be automatically adjusted according to the selected identification type.

In one embodiment, in response to identifying a three-dimensional (3D) object by the identification box 220, the appearance of the identification box 220 may be automatically adjusted to a full screen to scan the object. In response to identifying a two-dimensional (2D) code by the identification box 220, the appearance of the identification box 220 may be automatically adjusted to a square to scan the object. In response to identifying text by the identification box 220, the appearance of the identification box 220 may be automatically adjusted to a rectangle to scan the object.

In response to detecting that the user moves the electronic device towards the object, the size of the identification box 220 may gradually decrease as the distance between the electronic device and object decreases. In response to detecting that the user moves the electronic device away from the object, the size of the identification box 220 may gradually increases as the distance between the electronic device and object increases. In certain embodiments, the size of the identification box 220 may become maximized once detecting that the user moves the electronic device away from the object. It should be appreciated that the identification of the object in the captured image, for example whether the object is a 2D object, textual contents or an image—is performed by any image recognition techniques that are known to a skilled person.

Figure 3A:
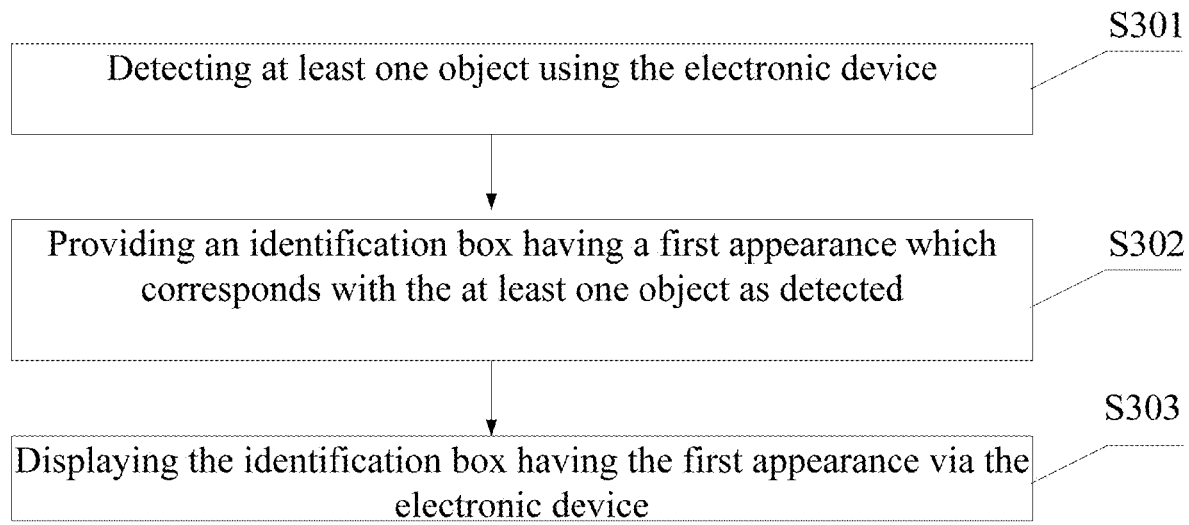
FIG. 3A illustrates a flow chart of an exemplary identification method implemented into an electronic device consistent with disclosed embodiments.

FIG. 3A illustrates a flow chart of an exemplary identification method implemented into an electronic device consistent with disclosed embodiments.

As shown in FIG. 3A, the identification method applied to the electronic device may include step S301, step S302, and step S303.

Step S301: detecting at least one object using the electronic device. Alternatively, the electronic device may detect at least one device whilst in a 'camera' mode using an image processing device (e.g. a camera) of the electronic device.

Step S302, providing an identification box having a first appearance which corresponds with the at least one object as detected. In one embodiment, the electronic device provides at least two identification boxes having different appearances, and identifies at least two types of objects. The at least two identification boxes having different appearances correspond with respective ones of the at least two types of objects. Different types of objects may correspond to different appearances of the identification boxes.

Step S303: displaying the identification box having the first appearance via the electronic device. Specifically, the identification box having the first appearance which matches the at least one object, may be in form of the identification box enclosing the at least one box within its boundaries.

Through implementing the disclosed identification method into the electronic device, the user may be able to quickly obtain the identification information by employing the above identification method, without excessive manual operations, which may simplify and speed up the user operation. In addition, the disclosed identification method may be applied to various application scenarios, thereby greatly improving the user experience.

In the disclosed embodiments, before performing the step S301, the user may open the App installed in the electronic device to enter the interface of the App. The interface of the App may include an identification box, and before performing the step S301, the appearance of the identification box may default to full screen, and the identification type may default to 3D object. The identification box may scan the object in any one or more animation modes to remind the user to scan. In the step S301, an image containing at least one object may be acquired. The acquired image may include one or more objects. For example, the image shown in FIG. 2 includes a 2D code, text, and a 3D object (such as a lighter), which is not limited by the present disclosure.

In the disclosed embodiments, in response to scanning the object in any one or more animation modes, the identification box may be rotating on the screen of the electronic device to scan the object in the image, or the identification box may be positioned in the middle of the screen, and one side of the identification box may move up and down or move left and right to scan the object in the image. The animation modes of the identification box during scanning the object are not limited by the present discourse.

In the step S302, the identification box having the first appearance that matches the object may be determined, wherein the first appearance may be the same as or similar to the appearance of the object. That is, the shape and size of the identification box may be the same as or similar to the shape and size of the object, respectively. It should be noted that, given that the shape and size of the identification box are the same as or similar to the shape and size of the object, respectively, the long side of the identification box may be different. For example, the long side of the identification box may be a line of different colors, or may have a decorative pattern, etc., providing different user experience.

In the disclosed embodiments, the electronic device can provide at least two identification boxes having different appearances. For example, the identification box may be a square identification box, a rectangular identification box, or a full screen identification box, which is not limited by the present disclosure.

Figure 3B:
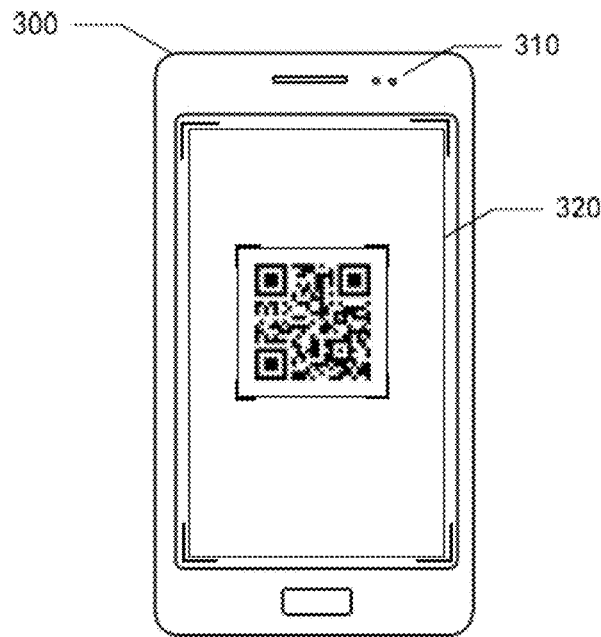
FIG. 3B illustrates a schematic diagram of an exemplary identification method implemented into an electronic device consistent with disclosed embodiments.

FIG. 3B illustrates a schematic diagram of an exemplary identification method implemented into an electronic device consistent with disclosed embodiments. As shown in FIG. 3B, before the electronic device 300 identifies an object, the identification box displayed on the electronic device 300 may be a full-screen identification box 320, and an imaging unit 310 may capture an identification object in the image through the full screen identification box 320. In response to capturing an identification object (for example, a 2D code), the full-screen identification box 320 may be changed to an identification box corresponding to the appearance of the identification object, such as a square identification box.

Figure 4:
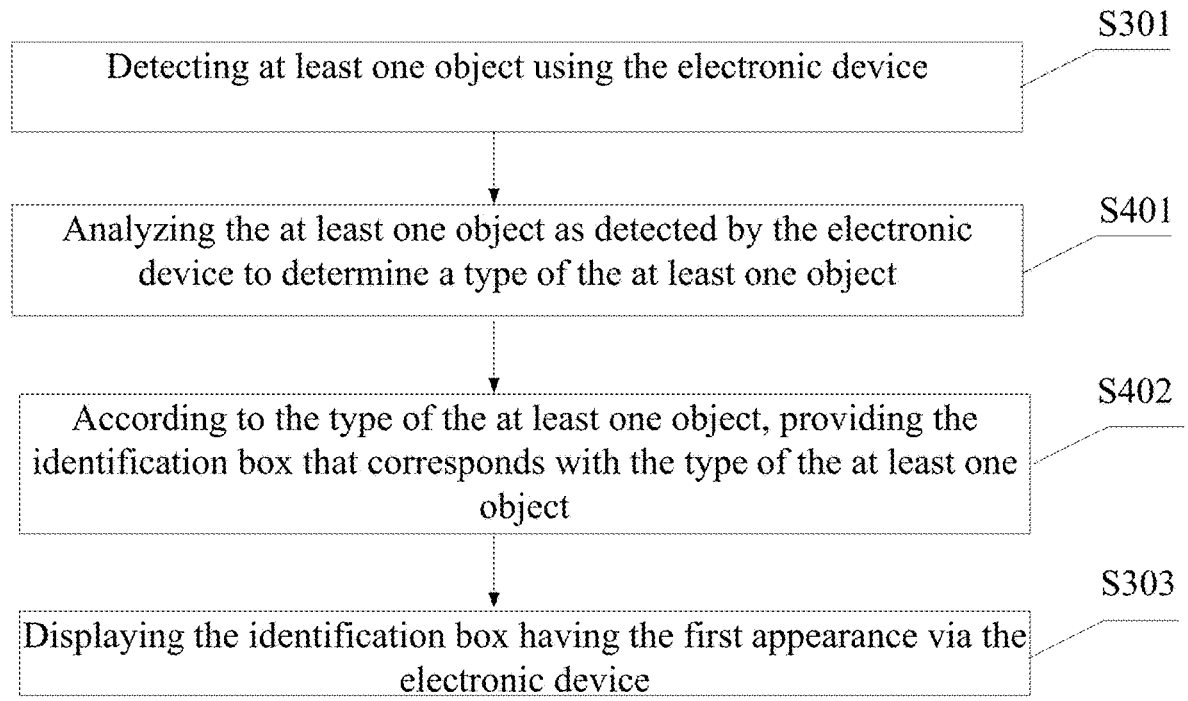
FIG. 4 illustrates a flow chart of another exemplary identification method implemented into an electronic device consistent with disclosed embodiments.

FIG. 4 illustrates a flow chart of another exemplary identification method implemented into an electronic device consistent with disclosed embodiments. The similarities between FIG. 4 and FIG. 3A are not repeated here, while certain difference may be explained.

As shown in FIG. 4, the step 302 of the identification method used in the electronic device may include step S401 and step S402.

Step S401: analyzing the at least one object as detected by the electronic device, to determine a type of the at least one object in the image; and Step S402: according to the type of the at least one object, providing the identification box that corresponds with the type of the at least one object.

In the disclosed embodiments, in the step S401, the type and the number of the objects in the image may be analyzed. The type and number of the objects in the image may be determined according to the analysis result, then in the step S402, the identification box that corresponds with the type of the at least one object may be provided according to the type of the object. For example, in response to identifying the object is a 2D code, the identification box that corresponds with the type of the at least one object may be provided according to the type of the object, and the appearance of the identification box corresponding to the 2D code may be determined to be a square. In response to identifying the object is text, the identification box that corresponds with the type of the at least one object may be provided according to the type of the object, and the appearance of the identification box corresponding to the text may be determined to be a rectangle. In response to identifying the object is a television (TV), the identification box that corresponds with the type of the at least one object may be provided according to the type of the object, and the appearance of the identification box corresponding to the TV may be determined to be a full screen.

That is, the identification box that corresponds with the type of the at least one object may be provided according to the type of the object, i.e., the appearance of the identification box may be determined according to the type of the object, thereby reducing the number of manual operations which have to be performed by the user. Through implementing the disclosed identification method into the electronic device, the user may only open and align the App with the identification object, without manually selecting the identification type, which may bring the user convenience and improve the user experience.

In the step S402, according to the type of the at least one object, providing the identification box that corresponds with the type of the at least one object further may include: adjusting at least one of shape and size of the identification box according to at least one of shape and size of the at least one object. The adjusting at least one of shape and size of the identification box according to at least one of shape and size of the at least one object may further include: receiving a user input to adjust at least one of the shape and size of the identification box.

For example, in response to determining the number of the objects is one in the step S401, the identification box may automatically adjust the appearance of the identification box according to the shape and size of the identification object, thereby matching the appearance of the identification object.

For another example, in response to determining the number of the objects is multiple in the step S401, the identification box may be desired to scan a specific object. Then the user may move the electronic device to match the location of the specific object. For example, the captured image may include one hundred apples of different colors, the user wants to obtain the information of one apple (i.e., the specific object). Then the user may move the electronic device to the apple located at the specific position, the shape and size of the identification box may be adjusted to be the same as or similar to the shape and size of the apple by a user manual operation, through which the information of the apple may be displayed. For example, the apple is produced in Aomori, Japan, the taste is good.

That is, the appearance of the identification box may be adjusted according to the specific object. Thus, the application scenario of the identification method may be very broad, and even there are multiple identification objects in the image, the problem that an existing identification method is unable to identify multiple identification objects in the image may be solved.

It should be noted that, in the step S401, the number of the objects may be determined to be multiple and the types of the multiple objects may be also different. After the electronic device does not recognize the object type within a fixed period of time, in one embodiment, the appearance of the identification box may be manually adjusted, i.e., the user may move the electronic device to the object located at the specific position, the shape and size of the identification box may be adjusted to be the same as or similar to the shape and size of the object by a manual operation. In another embodiment, the user may press and hold the identification object to start the voice input of the electronic device, through which the appearance of the identification box may be adjusted. For example, FIG. 2 illustrates three objects, the user may adjust the identification type and the appearance of the identification box to match the identification type and the appearance of the identification box of the 2D code, through inputting voice (e.g., saying "2D code").

In another embodiment, after the user presses and holds the identification object to start the voice input of the electronic device, the user may hear the key words of the corresponding identification type from the electronic device, then select the identification type by voice inputting the key words of the corresponding identification type. For example, after the user may press and hold the identification object to start the voice input of the electronic device, the electronic device may sequentially speak "2D code", "Translation" and "Image", the user may select the identification type by saying, for example, the keywords "2D code", then the identification type and the appearance of the identification box may be automatically adjusted to match the identification type and the appearance of the identification box of the 2D code.

That is, the user may be provided with multiple options to adjust the appearance of the identification box, thereby enhancing the user experience.

In the disclosed embodiments, the type of the object may include but not limited to a text, a 2D image or a 3D object. It should be noted that, other than the 2D code, the 2D image may also include but not limited to, a human photograph, an animal photograph or a scene photograph.

In the disclosed embodiments, in the step S303, the electronic device may also display information of the at least one object, in addition to displaying the identification box having the first appearance. For example, in response to identifying a photo of a celebrity, the appearance of the identification box may be displayed to the user in full screen, and information of the celebrity, such as the celebrity's name, nationality, and height, etc., may also be displayed at the edge of the identification box or in other areas.

In the disclosed embodiments, the identification method may further include: in response to determining that at least one of time and location at which the least one object as detected is the same as or similar to at least one of time and location at which a previous object was detected, adjusting the appearance of a current identification box to the appearance of a previous identification box. The current identification box may be corresponding to the least one object as detected, and the previous identification box may be corresponding to the previous object as detected.

For example, the user often opens an App installed in the electronic device at the same time and/or the same place to obtain some information. Then the App may record the time and/or place in the electronic device, such that after the user opens the App at the same time and/or the same place again, the identification box in the App may be automatically adjusted to the same appearance as the identification box when the user opened the App last time at the same time and/or the same place. Thus, the user may directly use the identification box in the App to scan the object without a manual operation.

It should be noted that, it is not necessarily for the user to open the App again at the same time and/or the same place, i.e., the user may also open the App again at similar time and/or similar place. For example, the user often uses the App to obtain information at his/her workstations, and after the user opens the App at other colleagues' workstations, the identification box may be also automatically adjusted to the same appearance as the identification box when the user opens the App at his/her workstation.

The appearance of the identification box may be automatically adjusted in any appropriate application scenarios. For example, the user often opens an App to recognize a 2D code at a certain location. Then after the user captures an image shown in FIG. 2 at the certain location, the App in the electronic device may determine that a 2D code exists in the image after analyzing the image. Then the identification box may be automatically determined to be the identification box for scanning the 2D code, and the determined identification box may be displayed on the determined object (i.e., the 2D code).

The present disclosure also provides an identification system 500 implemented into an electronic device.

Figure 5:
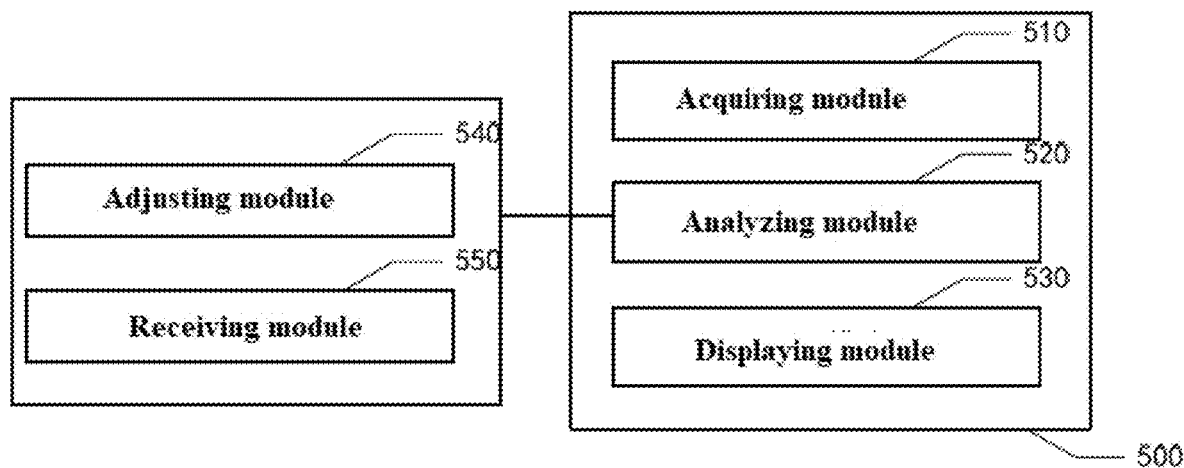
FIG. 5 illustrates a block diagram of an exemplary identification system in an electronic device consistent with disclosed embodiments.

FIG. 5 illustrates a block diagram of an exemplary identification system 500 in an electronic device consistent with disclosed embodiments.

As shown in FIG. 5, the identification system 500 may include an acquiring module 510, an analyzing module 520, and a displaying module 530. The identification system 500 may perform the identification methods described above with reference to FIGS. 3 and 4, to enable the App in the electronic device to automatically and/or manually adjust the appearance of the identification box.

In particular, the acquiring module 510 may detect at least one object using the electronic device.

The analyzing module 520 may provide an identification box having a first appearance which corresponds with the at least one object as detected. In one embodiment, the electronic device provides at least two identification boxes having different appearances, and identifies at least two types of objects. The at least two identification boxes having different appearances correspond with respective ones of the at least two types of objects. Different types of objects may correspond to different appearances of the identification boxes.

The displaying module 530 may display the identification box having the first appearance via the electronic device.

The specific implementation process of the acquiring module 510, the analyzing module 520, and the displaying module 530 has been described in detail in FIG. 3, and the details are not repeated here.

The analyzing module 520 may further include an adjusting module 540 and a receiving module 550.

The adjusting module 540 may adjust at least one of shape and size of the identification box according to at least one of shape and size of the at least one object.

The receiving module 550 may receive a user input to adjust at least one of the shape and size of the identification box.

The specific implementation process of the adjusting module 540 and the receiving module 550 has been described in detail in the foregoing FIG. 4, and the details are not repeated here.

In the disclosed embodiments, in response to determining that at least one of time and location at which the least one object as detected is the same as or similar to at least one of time and location at which a previous object was detected, the system 500 may further adjust the appearance of a current identification box to the appearance of a previous identification box. The current identification box may be corresponding to the least one object as detected, and the previous identification box may be corresponding to the previous object as detected.

For example, the user often opens an App of the electronic device at the same time and/or the same place to obtain some information. Then the application may record the time and/or place in the electronic device, such that after the user opens the App at the same time and/or the same place again, the identification box in the App may be automatically adjusted to have the same appearance as the identification box after the user opens the App at the same time and/or the same place last time. Thus, the user may directly use the identification box in the App to scan the object without a manual operation.

It should be noted that, it is not necessarily for the user to open the App again at the same time and/or the same place, i.e., the user may also open the App again at similar time and/or similar place. For example, the user often uses the App to obtain information at his/her workstation, and after the user opens the App at other colleagues' workstations, the identification box may be also automatically adjusted to the same appearance as the identification box after the user opens the App at his/her workstation. That is, even the user opens the App at his/her colleague's workstation rather than at his/her own workstation, the identification box may be still automatically adjusted to the same appearance as the identification box.

In one embodiment, the acquiring module 510, the analyzing module 520, the displaying module 530, the adjusting module 540 and the receiving module 550 may be combined into one module. In another embodiment, any one of the acquiring module 510, the analyzing module 520, the displaying module 530, the adjusting module 540 and the receiving module 550 may be split into multiple modules. In another embodiment, at least one function of one or more of the acquiring module 510, the analyzing module 520, the displaying module 530, the adjusting module 540 and the receiving module 550 may be combined with at least one function of the other modules and implemented in one module.

Further, at least one of the acquiring module 510, the analyzing module 520, the displaying module 530, the adjusting module 540 and the receiving module 550 may be at least partially implemented as a hardware circuit, such as a field programmable gate array (FPGA) programmable logic array (PLA), system-on-chip, system on a substrate, system on package, application specific integrated circuit (ASIC), or implemented as any other appropriate ways that the circuit can be integrated or packaged such as hardware or firmware, or implemented in any appropriate combination of software, hardware and firmware. In certain embodiments, at least one of the acquiring module 510, the analyzing module 520, the displaying module 530, the adjusting module 540 and the receiving module 550 may be at least partially implemented as a computer program module which, when executed by a computer, may perform the functions of the corresponding module.

Figure 6:
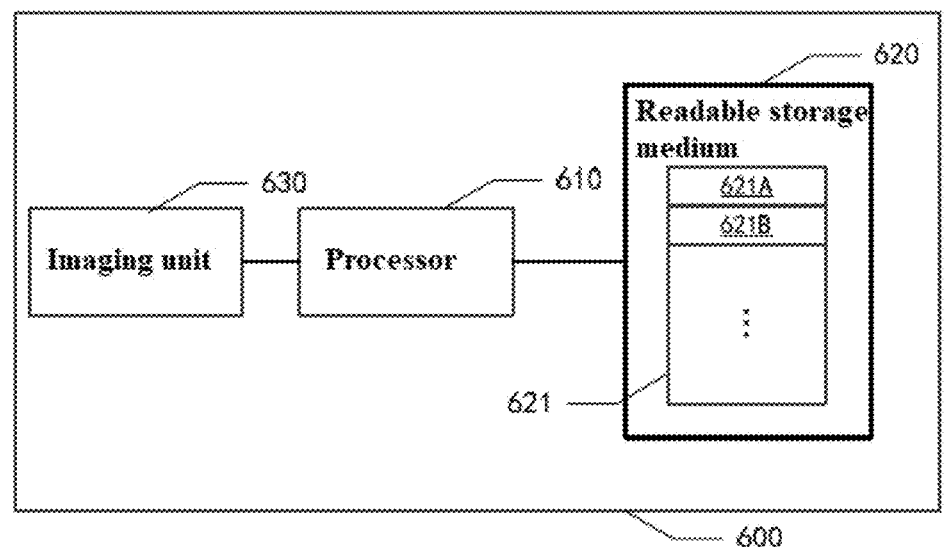
FIG. 6 illustrates a block diagram of an exemplary electronic device consistent with disclosed embodiments.

FIG. 6 illustrates a block diagram of an exemplary electronic device 600 consistent with disclosed embodiments.

As shown in FIG. 6, the electronic device 600 includes a processor 610, a computer-readable storage medium 620, an imaging unit 630 coupled to the processor 610, and a display unit coupled to the processor 610.

The electronic device 600 may perform the identification methods described above with reference to FIGS. 3 and 4, such that the App in electronic device may be able to automatically and/or manually adjust the appearance of the identification box.

The imaging unit 630 may be operative to detect at least one object, the processor 610 may be operative to determine an identification box having a first appearance which corresponds with the at least one object as detected by the imaging unit 630, and the display unit may be operative to display the identification box having the first appearance on the electronic device as determined by the processor 610. In one embodiment, the electronic device provides at least two identification boxes having different appearances, and identifies at least two types of objects. The at least two identification boxes having different appearances correspond with respective ones of the at least two types of objects. Different types of objects may correspond to different appearances of the identification boxes.

In particular, the processor 610 may include, for example, general purpose microprocessors, instruction set processors, and/or associated chipsets, and/or special purpose microprocessors (e.g., application specific integrated circuits (ASICs)), etc. The processor 610 may also include an on-board memory for caching purposes. The processor 610 may be a single processing unit or a plurality of processing units which perform the identification methods described with reference to FIG. 3 and FIG. 4.

In partiuclar, the processor 610 may further determine at least two identification boxes having different appearances, and to identify at least two types of objects. The processor 610 may further determine a type of the at least one object in the image; and according to the type of the at least one object, determine an appearance of the identification box. The processor 610 may further adjust at least one of shape and size of the identification box according to at least one of shape and size of the at least one object. The processor 610 may further receive a user input to adjust at least one of the shape and size of the identification box. The processor 610 may further in response to determining that at least one of time and location at which the least one object as detected is the same as or similar to at least one of time and location at which a previous object was detected, adjust the appearance of a current identification box to the appearance of a previous identification box, in which the current identification box is corresponding to the least one object as detected, and the previous identification box is corresponding to the previous object as detected. After the type of the at least one object in the image is not determined within a fixed period of time, the processor 610 may further adjust the appearance of the identification box through a manual adjustment, or adjust the appearance of the identification box according to a voice input.

The display unit may further display information of the at least one object, in addition to displaying the identification box having the first appearance on the electronic device as determined by the processor. The display unit may further display the at least two identification boxes having different appearances that corresponds with respective ones of the at least two types of objects.

The computer-readable storage media 620 may be any tangible medium that can contain, or store a program for use by or in connection with an instruction execution system, apparatus, or device. For example, the computer-readable storage media 620 may include but not limited to, an electronic, magnetic, optical, electromagnetic, infrared, or semiconductor system, apparatus, or device, or any suitable combination of the foregoing. More specific examples (a non-exhaustive list) of the computer readable storage medium would include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a transmission media such as those supporting the internet or an intranet, or any suitable combination of the foregoing.

The computer readable storage medium 620 may include a computer program 621. The computer program 621 may include code/computer executable instructions that, when executed by the processor 610, causes the processor 610 to perform the identification methods described above with reference to FIGS. 3 and 4, and any variations thereof.

The computer program 621 may be a computer program code which may include, for example, a computer program module. For example, in one embodiment, the code in the computer program 621 may include one or more program modules, such as 621A, and a module 621B, etc. It should be noted that, the dividing manner and the number of the modules may not be fixed, and those skilled in the art may use any appropriate program modules or any appropriate combination of program modules according to various application scenarios. When executed by the processor 610, the combination of the program modules may cause the processor 610 to execute the identification method described above with reference to FIG. 3 and FIG. 4, and any variations thereof.

In the disclosed embodiments, the processor 610 may interact with the imaging unit 630 to execute the identification method described above with reference to FIG. 3 and FIG. 4, and any variations thereof.

In certain embodiments, at least one of the acquiring module 510, the analyzing module 520, the displaying module 530, the adjusting module 540 and the receiving module 550 may be implemented as a computer program module described with reference to FIG. 6. When executed by the processor 610, the computer program module may execute the identification method described above with reference to FIG. 3 and FIG. 4, and any variations thereof.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An identification method applied to an electronic device, comprising:
   detecting at least one object using the electronic device;
   providing an identification box having a first appearance which corresponds with the at least one object as detected, including:
      analyzing the at least one object as detected by the electronic device to determine a type of the at least one object;
      after the type of the at least one object is not determined within a fixed period of time, performing one of: allowing manually adjusting an appearance of the identification box by a user, adjusting the appearance of the identification box according to a voice input of the user, and displaying a hint of the type of the at least on object for the user to select; and
      according to the type of the at least one object, providing the identification box that corresponds with the type of the at least one object; and
   displaying the identification box having the first appearance via the electronic device.

2. The identification method according to claim 1, wherein the electronic device provides at least two identification boxes having different appearances, and identifies at least two types of objects.

3. The identification method according to claim 1, wherein the type of the at least one object includes at least one of:
   text, two-dimensional (2D) image, and three-dimensional (3D) object.

4. The identification method according to claim 1, wherein the according to the type of the at least one object, providing the identification box that corresponds with the type of the at least one object further comprises:
   adjusting at least one of shape and size of the identification box according to at least one of shape and size of the at least one object.

5. The identification method according to claim 4, wherein the adjusting at least one of shape and size of the identification box according to at least one of shape and size of the at least one object further comprises:
- receiving a user input to adjust at least one of the shape and size of the identification box.

6. The identification method according to claim 1, further comprising:
- in response to determining that at least one of time and location at which the least one object as detected is the same as or similar to at least one of time and location at which a previous object was detected, adjusting an appearance of a current identification box to the appearance of a previous identification box,
- wherein the current identification box is corresponding to the least one object as detected, and the previous identification box is corresponding to the previous object as detected.

7. The identification method according to claim 1, wherein the displaying the identification box having the first appearance via the electronic device further comprises:
- displaying information of the at least one object, in addition to displaying the identification box having the first appearance.

8. The identification method according to claim 2, wherein:
- the at least two identification boxes having different appearances correspond with respective ones of the at least two types of objects.

9. An electronic device, comprising:
- a processor;
- an imaging unit coupled to the processor; and
- a display unit coupled to the processor,
- wherein the imaging unit is operative to detect at least one object, the processor is operative to:
  - analyze the at least one object as detected by the electronic device to determine a type of the at least one object,
  - after the type of the at least one object is not determined within a fixed period of time, perform one of: allowing manually adjusting an appearance of the identification box by a user, adjusting the appearance of the identification box according to a voice input of the user, and displaying a hint of the type of the at least on object for the user to select, and
  - according to the type of the at least one object, provide an identification box that corresponds with the type of the at least one object, and
- the display unit is operative to display the identification box having the first appearance on the electronic device as determined by the processor.

10. The electronic device according to claim 9, wherein the processor is further configured to:
- determine at least two identification boxes having different appearances, and to identify at least two types of objects.

11. The electronic device according to claim 9, wherein the type of the at least one object includes at least one of: text, two-dimensional (2D) image, and three-dimensional (3D) object.

12. The electronic device according to claim 9, wherein the processor is further configured to:
- adjust at least one of shape and size of the identification box according to at least one of shape and size of the at least one object.

13. The electronic device of claim 12, wherein the processor is configured to:
- receive a user input to adjust at least one of the shape and size of the identification box.

14. The electronic device according to claim 9, wherein the processor is further configured to:
- in response to determining that at least one of time and location at which the least one object as detected is the same as or similar to at least one of time and location at which a previous object was detected, adjust an appearance of a current identification box to the appearance of a previous identification box,
- wherein the current identification box is corresponding to the least one object as detected, and the previous identification box is corresponding to the previous object as detected.

15. The electronic device according to claim 9, wherein the display unit is configured to:
- display information of the at least one object, in addition to displaying the identification box having the first appearance on the electronic device as determined by the processor.

16. The electronic device according to claim 10, wherein the display unit is configured to:
- display the at least two identification boxes having different appearances that corresponds with respective ones of the at least two types of objects.

* * * * *